(12) United States Patent
Parnin et al.

(10) Patent No.: US 8,424,646 B2
(45) Date of Patent: Apr. 23, 2013

(54) INTERRUPTION TOLERANT LUBRICATION SYSTEM

(75) Inventors: Francis J. Parnin, Suffield, CT (US); Denman H. James, Windsor, CT (US)

(73) Assignee: United Technologies Corporation, Hartford, CT (US)

( * ) Notice: Subject to any disclaimer, the term of this patent is extended or adjusted under 35 U.S.C. 154(b) by 1986 days.

(21) Appl. No.: 11/483,881

(22) Filed: Jul. 10, 2006

(65) Prior Publication Data

US 2008/0006483 A1 Jan. 10, 2008

(51) Int. Cl.
*F16N 29/00* (2006.01)

(52) U.S. Cl.
USPC .............................................. 184/6

(58) Field of Classification Search ............ 184/6, 6.1, 184/6.4, 6.11, 6.16
See application file for complete search history.

(56) References Cited

U.S. PATENT DOCUMENTS

| | | | |
|---|---|---|---|
| 4,309,870 A | 1/1982 | Guest et al. | |
| 4,424,665 A | 1/1984 | Guest et al. | |
| 4,531,358 A | 7/1985 | Smith | |
| 4,888,947 A | 12/1989 | Thompson | |
| 4,891,934 A | 1/1990 | Huelster | |
| 4,917,218 A | 4/1990 | Murray | |
| 4,976,335 A | 12/1990 | Cappellato | |
| 5,046,306 A | 9/1991 | Borre, Jr. | |
| 5,588,503 A * | 12/1996 | Rinaldo | 184/6.4 |
| 5,769,182 A * | 6/1998 | Parenteau | 184/6.4 |
| 6,481,978 B2 | 11/2002 | Zamalis et al. | |
| 2006/0054404 A1* | 3/2006 | El-Ibiary | 184/6 |
| 2006/0054406 A1* | 3/2006 | Delaloye | 184/6.11 |

OTHER PUBLICATIONS

Conventional Lubrication System, two pages, Dated Aug. 25, 2009.

\* cited by examiner

*Primary Examiner* — Michael Mansen
*Assistant Examiner* — Robert T Reese
(74) *Attorney, Agent, or Firm* — Carlson, Gaskey & Olds PC

(57) ABSTRACT

A lubrication system for a turbine engine or other application includes a first or primary branch 12 and a second or secondary branch 14, a main pump 16, a lubricant distributor 18 for receiving lubricant from the main pump and distributing the lubricant to the branches, and a auxiliary pump 30 in the second branch downstream of the distributor. The system is operable in a normal mode of operation in which lubricant flows from a lubricant source into the primary and secondary branches 12, 14 and is also operable in a backup mode of operation in which lubricant backflows from the primary branch into the secondary branch.

15 Claims, 4 Drawing Sheets

INTERRUPTION TOLERANT LUBRICATION SYSTEM

TECHNICAL FIELD

This invention relates to lubrication systems and particularly to a multi-branch lubrication system capable of diverting lubricant from a branch with tolerance for lubricant starvation to a branch with less tolerance for lubricant starvation.

BACKGROUND

Aircraft gas turbine engines include a number of components requiring lubrication. Examples of such components include rotor shaft rolling element bearings, gear teeth and journal bearings for supporting gears. These components may be supplied with lubricant by different, parallel branches of a lubrication system. Certain of these components may be relatively intolerant to lubricant starvation. Other components may have relatively more tolerance for lubricant starvation.

In a conventional lubrication system, events such as aircraft maneuvers can result in lubricant starvation of both the starvation tolerant components and the starvation intolerant components. As a result, the starvation intolerant components may suffer significant damage requiring subsequent replacement of those components. In more extreme situations, the starvation intolerant components may be rendered inoperative. Accordingly, it is desirable to have a lubrication system architecture that continues to deliver lubricant, at least temporarily, to the starvation intolerant components.

SUMMARY

One embodiment of the lubrication system described herein includes a first relatively starvation tolerant branch, a second relatively starvation intolerant branch, a main pump, a lubricant distributor for receiving lubricant from the main pump and distributing the lubricant to the branches, and an auxiliary pump in the second branch downstream of the distributor.

A related lubrication system architecture includes a first branch for delivering lubricant to components having, as a whole, a relatively higher tolerance for lubricant starvation and a second branch for delivering lubricant to components having, as a whole, a relatively lower tolerance for lubricant starvation. The system architecture also includes means for backflowing lubricant from the first branch into the second branch in the event that the lubrication requirement of at least the second branch cannot be satisfied.

A related method of supplying lubricant includes flowing the lubricant from a lubricant source into primary and secondary branches and, in the event that the lubricant is inadequate to satisfy the lubrication requirement of at least the secondary branch, backflowing lubricant from the primary branch into the secondary branch.

The foregoing and other features of the various embodiments of the lubrication system, architecture and lubrication method will become more apparent from the following detailed description and the accompanying drawings.

DETAILED DESCRIPTION

Figure 1:
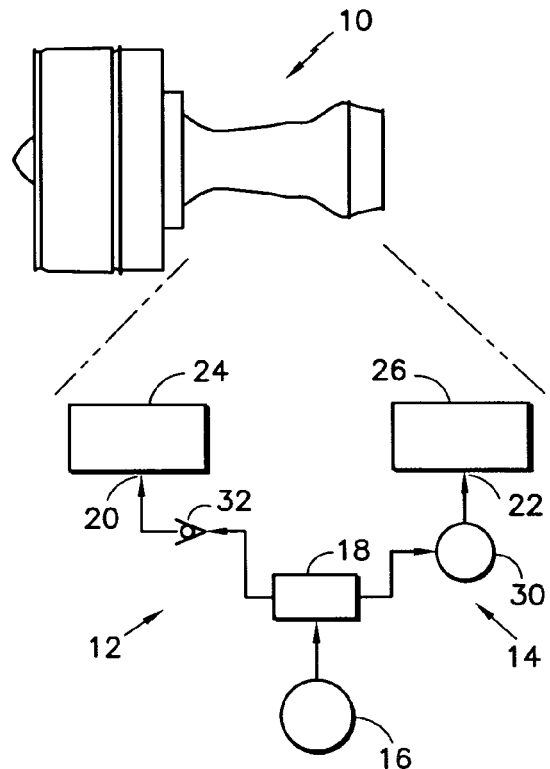
FIG. 1 is a schematic view of a turbine engine and an associated multi-branch lubrication system and system architecture showing a normal mode of operation.

FIG. 1 shows an aircraft gas turbine engine 10 and an associated multi-branch lubrication system and system architecture. The system includes a first branch 12 and a second branch 14. A main pump 16 draws lubricant from a tank, not shown, or other source of lubricant. The pump pumps the lubricant to a lubricant distributor 18, such as a manifold or distribution valve, which receives the lubricant and distributes it to the branches. Each branch has a destination 20, 22. In the illustrated system, a component requiring lubrication resides at each destination. Examples of such components are a rotor shaft roller bearing 24 and a journal bearing 26 for rotatably supporting a gear. In many typical applications a lubricant recovery system, not shown, recovers the lubricant from the components, and returns it to the lubricant source.

The components 24, 26 have differing degrees of tolerance for lubricant starvation. For example, the journal bearing 26 is less tolerant of lubricant starvation and the roller bearing 24 is more tolerant of lubricant starvation. Because the first branch serves a component that is relatively more tolerant to lubricant starvation, the first branch, and the component, may be referred to as being tolerant to lubricant starvation. Because the second branch serves a component that is relatively less tolerant to lubricant starvation, the second branch, and the component, may be referred to as being intolerant to lubricant starvation. By referring to a component or branch as starvation tolerant we do not mean that the component or branch can operate indefinitely without adequate lubricant. By referring to a component or branch as starvation intolerant we do not mean that the component or branch cannot operate for at least a brief time without a normal quantity of lubricant. Instead, tolerance or intolerance for lubricant starvation are relative rather than absolute attributes of the components and branches. In addition, lubricant starvation does not necessarily mean that a component or branch is completely deprived of lubricant, but merely that the component or its associated branch is receiving less lubricant than is satisfactory.

The system also includes an auxiliary pump 30 in the second branch downstream (in the direction of normal lubricant flow indicated by the fluid flow arrows) of the distributor 18 and upstream of destination 22 and its associated journal bearing 26. The auxiliary pump resides in the second branch because the second branch is the branch serving the component with relatively less tolerance for lubricant starvation. Because of the presence of the auxiliary pump, branch 14 may be referred to as a secondary branch. Branch 12 may therefore be referred to as a primary branch. Designating branch 14 as a secondary branch does not imply that branch 14 or component 26 are in any way less important than the primary branch 12 and component 24.

As seen in FIG. 1, the system is operable in a normal mode in which lubricant flows from the main pump, through the distributor 18 into the branches 12, 14 and ultimately to the destinations 20, 22. The auxiliary pump 30 operates concurrently with the main pump 16. The system branches 12, 14, and more specifically the components 24, 26 served by those branches each have an individual lubrication requirement. The branches collectively have an aggregate lubrication requirement. The individual and aggregate lubrication requirements are satisfied by the lubrication system during operation in the normal mode.

Figure 2:
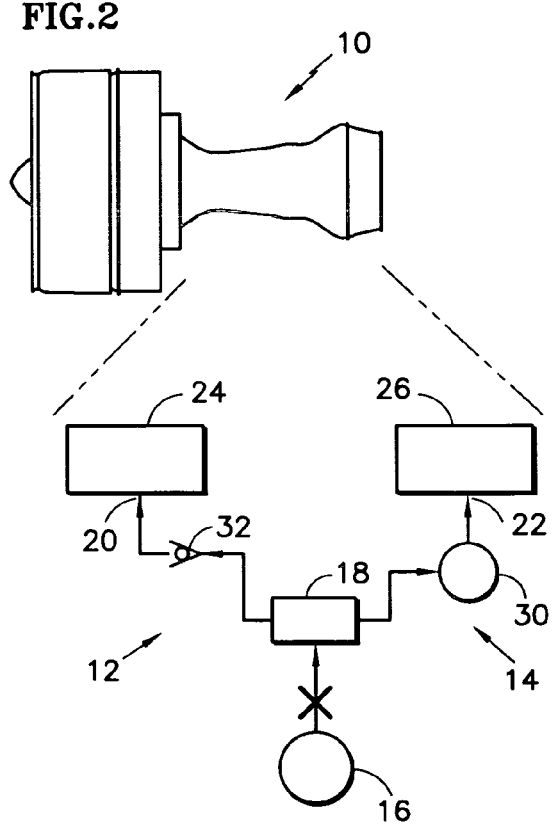
FIG. 2 is a schematic view of the turbine engine and multi-branch lubrication system and system architecture of FIG. 1 showing a backup mode of operation.

As seen in FIG. 2, the system is also operable in a backup mode. Operation in the backup mode occurs when the flow of lubricant from the main pump 16 is inadequate to satisfy at least the lubrication requirement of the lubricant intolerant branch 14, more specifically, the lubrication requirements of the components 26 served by that branch. This condition may correspond to an aircraft maneuver that temporarily impairs the ability of the lubrication system to deliver a satisfactory quantity of lubricant. Or the condition requiring operation in the backup mode may be a more severe and/or persistent event such as a leak, rupture or blockage in the lubrication system. The "X" symbol just downstream of the main pump in FIG. 2 signifies the inability of the system to satisfy the lubrication requirements irrespective of the reason for such inability. In the backup mode, the auxiliary pump 30 urges a reverse flow or backflow of lubricant from the first branch 12 into the second branch 14 as indicated by the fluid flow arrows. As a result, the starvation tolerant component 24 in the starvation tolerant branch 12 experiences a greater deprivation of lubricant than would otherwise be the case. However the starvation intolerant component 26 in the starvation intolerant branch 14 receives more lubricant than would otherwise be the case. Specifically, the second branch receives enough lubricant to satisfy its minimum lubrication requirements. The minimum lubrication requirements may include a minimum lubricant quantity and/or a minimum duration or time during which lubricant must be supplied.

In order to operate as just described, the primary branch 12, i.e. the branch with greater starvation tolerance, is configured to have an available lubricant capacity sufficient to satisfy the minimum lubrication requirements of the less starvation tolerant secondary branch 14. The capacity of the branch 12 is a function of the volume of lubricant contained in the conduits and other elements of the branch. However a designer will recognize that the entire volume of lubricant in the primary branch 12 may not be available, or at least not readily available, for reverse flow into the secondary branch 14. Availability may be limited by the presence of hardware or features in a branch that prevent or impede reverse lubricant flow in the branch. For example, a check valve 32 in branch 12 would limit the available lubricant capacity to the lubricant contained in the branch between the distributor 18 and the check valve. The system designer will size and locate the elements and features of the primary branch in order to ensure the availability of sufficient lubricant capacity to satisfy the minimum lubrication requirements of the starvation intolerant secondary branch.

Figure 3:
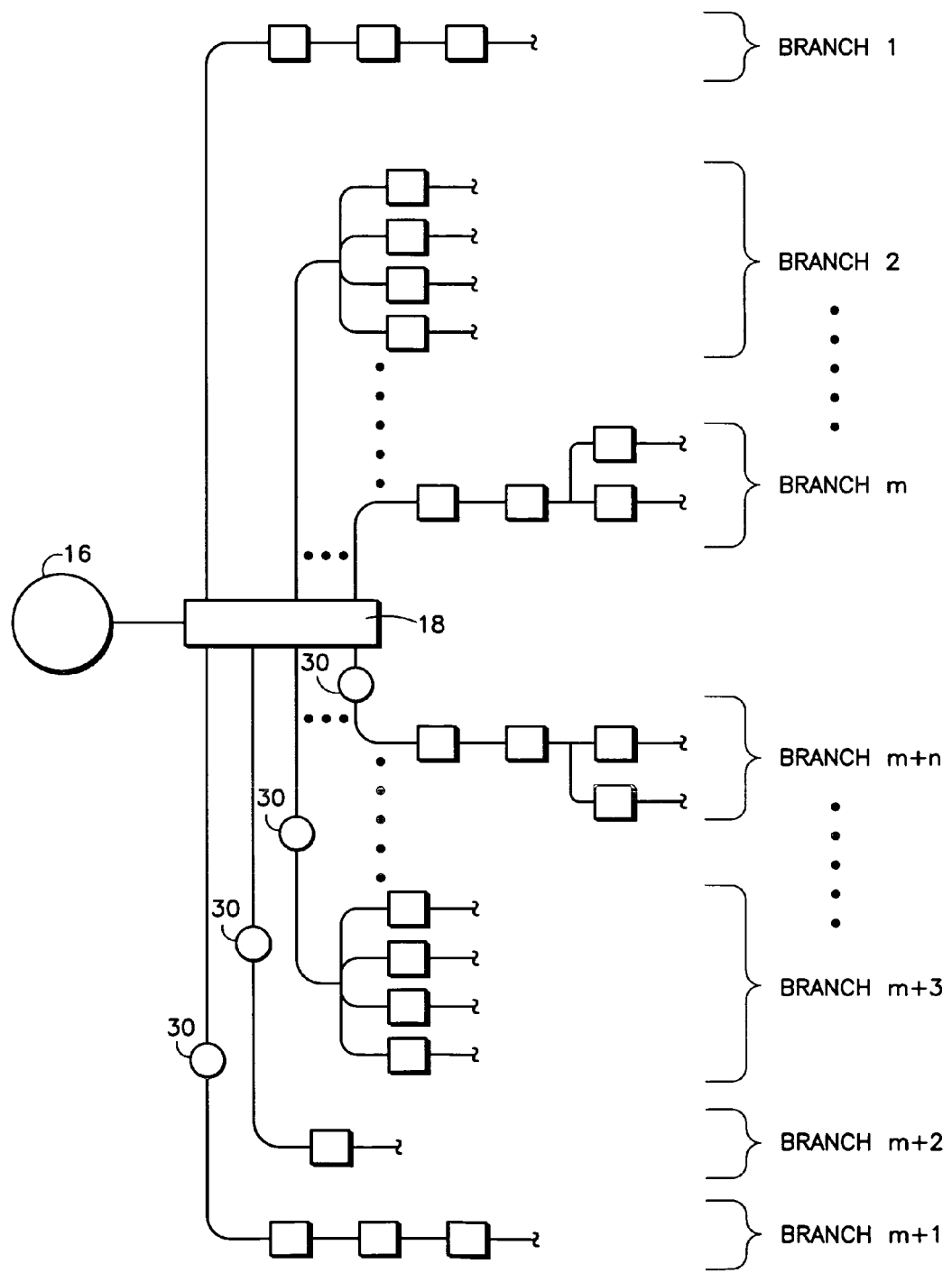
FIG. 3 is a schematic view of a more general lubrication system and system architecture of FIGS. 1 and 2.

For simplicity, the above example describes a system having only two branches, each of which serves only one component. More generally, and as seen in FIG. 3, the system may have three or more branches each serving one or more components. The components of a given branch may be arranged in series, in parallel, or in any series/parallel combination. FIG. 3 shows such a system having m starvation tolerant branches and n starvation intolerant branches. Each starvation intolerant branch includes an auxiliary pump 30. During normal operation, the main pump 16 pumps lubricant to all the branches. During operation in the backup mode, i.e. when the main pump cannot satisfy the lubrication requirements of at least the starvation intolerant branches, the auxiliary pumps cause lubricant to backflow from the starvation tolerant branches (branches 1 through m) into the starvation intolerant branches (branches m+1 through m+n).

Figure 4:
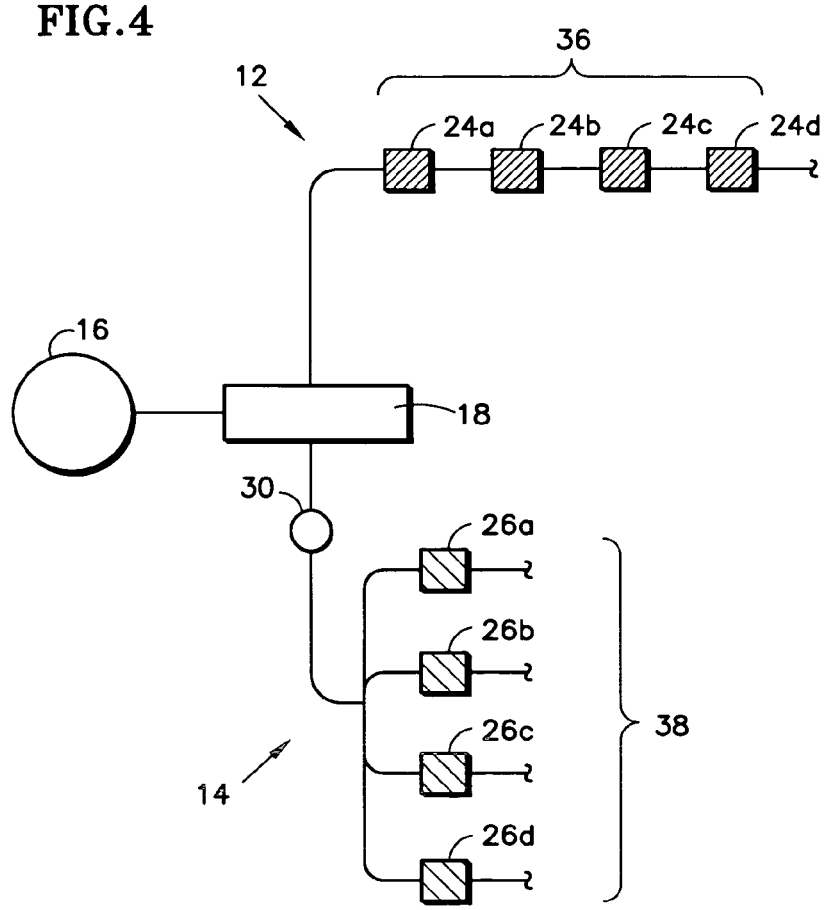
FIG. 4 is a schematic view of a lubrication system and system architecture showing two system branches, each serving multiple components.

FIG. 4 shows a lubrication system architecture. For simplicity, a system architecture with only two branches is shown, however the principles described herein are applicable to system architectures with three or more branches. The illustrated system includes a first branch 12 serving a first group 36 of components 24 and a second branch 14 serving a second group 38 of components 26. The components of the first group 36 are, as a whole, more tolerant of lubricant starvation. The components of the second group 38 are, as a whole, less tolerant of lubricant starvation. The second branch includes a auxiliary pump 30 or other means for backflowing lubricant from the first branch to the second branch. As described above, during normal operation the pump delivers lubricant to both branches. During backup operation, i.e. when the lubrication requirements of at least the second branch cannot be satisfied, the auxiliary pump 30 causes lubricant to backflow from the first branch into the second branch.

Figure 5:
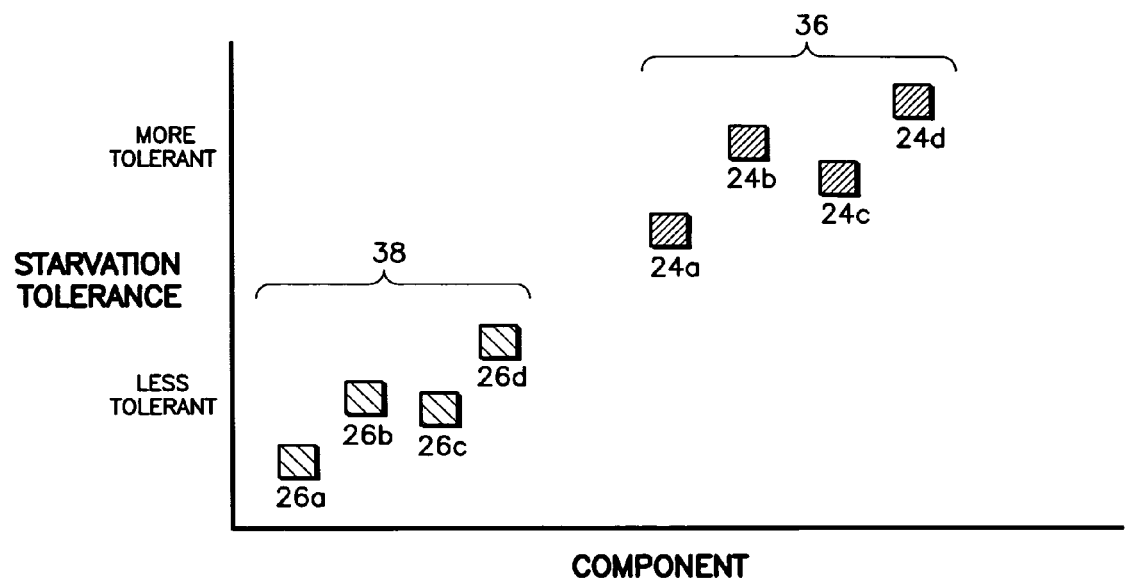
FIG. 5 is a graph showing a grouping of components for the architecture of FIG. 4.
Figure 6:
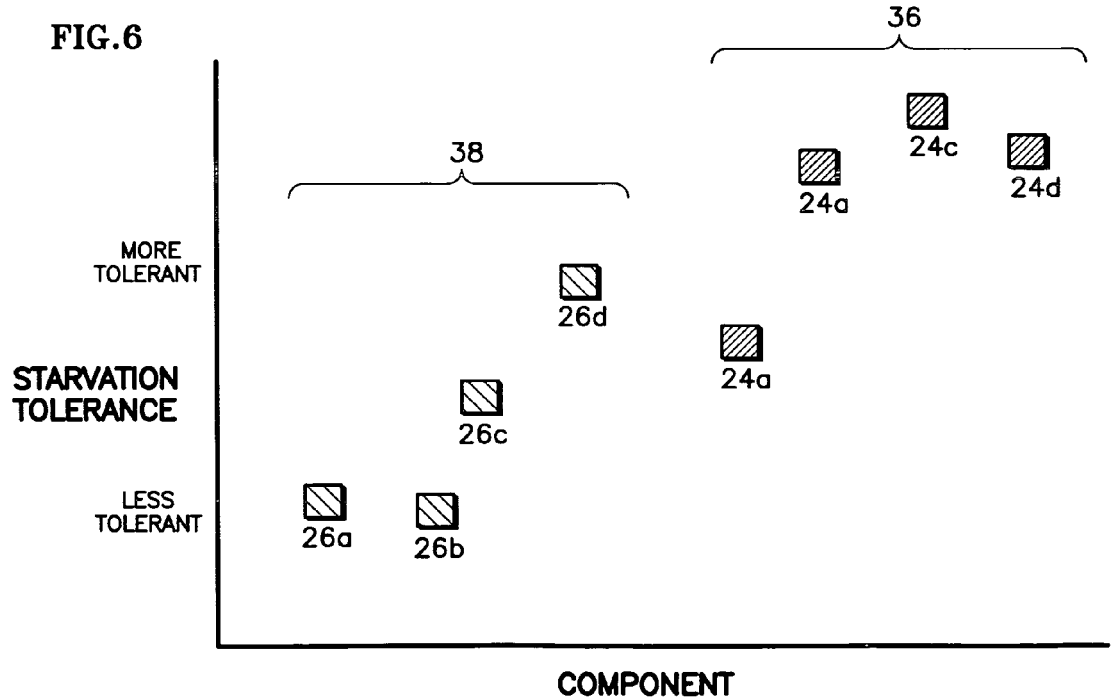
FIG. 6 is a graph showing an alternate grouping of components for the architecture of FIG. 4.

The above described first group 36 of components having a higher starvation tolerance and second group 38 of components having a lower starvation tolerance may be defined in a number of ways. For example, and as seen in FIG. 5, even the least starvation tolerant member 24a of the first group 36 may have more starvation tolerance than the most starvation tolerant component 26d of the second group 38. Under this definition, there is no tolerance overlap between the groups. However, as seen in FIG. 6, a designer may also choose to define the groups such that at least one member of the starvation tolerant first group (e.g. component 24a) has less starvation tolerance than at least one member (e.g. component 26d) of the starvation intolerant second group. The designer nevertheless considers group 36 to be more starvation tolerant as a whole than group 38. In other words, when all factors are considered, group 36 is more starvation tolerant than group 38, notwithstanding the overlap seen in FIG. 6. Such groupings may be necessary because of, for example, constraints on the relative positioning and interrelationships between components. In other words, constraints other than the intrinsic starvation tolerance of the individual components may dictate that component 24a be in starvation tolerant group 36 rather than in group 38. Such a grouping may be justified if, for example, component 24a, is not highly critical to the continued satisfactory operation of the engine. In general, the grouping of components into starvation tolerant and starvation intolerant branches may account for not only a component's intrinsic ability to continue operating in a lubricant starved state, but also its criticality to continued operation of the engine 10, the difficulty and expense of replacing or repairing it if it sustains damage and other relevant factors. Moreover, although FIG. 6 depicts only a small overlap involving only one component from each group, the overlap may be more extensive and may involve more than one component from at least one of the groups.

Although the lubrication system, architecture and method have been described in the context of an aircraft gas turbine engine, it is nevertheless applicable to other machinery having multibranch lubrication systems.

Although this disclosure refers to specific embodiments, it will be understood by those skilled in the art that various changes in form and detail may be made without departing from the subject matter set forth in the accompanying claims.

We claim:

1. A lubrication system comprising:
a first, relatively starvation tolerant branch;
a second, relatively starvation intolerant branch;
a main pump;
a lubricant distributor for receiving lubricant from the main pump and distributing the lubricant to the branches; and
an auxiliary pump in the second branch downstream of the distributor.

2. The system of claim 1 wherein the more starvation tolerant branch is configured to have an available lubricant capacity sufficient to satisfy minimum lubrication requirements of the less starvation tolerant branch.

3. The system of claim 2 wherein the minimum lubrication requirements include at least one of a lubricant quantity and a lubricant supply duration.

4. The lubrication system of claim 1 wherein each branch supplies lubricant to a destination and a component requiring lubrication resides at each destination.

5. The system of claim 1 wherein the system is operable in a normal mode in which lubricant flows from the main pump into the branches and is also operable in a backup mode in which lubricant backflows from the more starvation tolerant branch to the less starvation tolerant branch.

6. The system of claim 5 wherein the auxiliary pump urges lubricant flow from the more starvation tolerant branch into the less starvation tolerant branch.

7. The system of claim 5 wherein the less starvation tolerant branch receives lubricant backflowing from the more starvation tolerant branch exclusively through the distributor and the auxiliary pump in the backup mode.

8. The system of claim 5 wherein lubricant flows from the distributor to the more starvation branch in a first direction, and from the first starvation branch to the distributor in an opposing, second direction.

9. A turbine engine including the lubrication system of claim 1.

10. A method of supplying lubricant to primary and secondary branches in a lubrication system, the branches each having an individual lubrication requirement, the method comprising:
flowing the lubricant from a lubricant source into the primary and secondary branches; and
in the event that the lubricant from the lubricant source is inadequate to satisfy the individual lubrication requirement of at least the secondary branch, backflowing lubricant from the primary branch into the secondary branch.

11. The method of claim 10 wherein the backflowing reverses the flow direction of the lubricant.

12. A lubrication system architecture comprising:
a first branch for delivering lubricant to a first group of components having, as a whole, a relatively higher tolerance for lubricant starvation;
a second branch for delivering lubricant to a second group of components having, as a whole, a relatively lower tolerance for lubricant starvation, the first and second branches each having an individual lubrication requirement;
means for backflowing lubricant from the first branch to the second branch in the event that the individual lubrication requirement of at least the second branch cannot be satisfied.

13. The architecture of claim 12 wherein there is no overlap in lubrication tolerance of the groups.

14. The architecture of claim 12 wherein at least one member of the starvation tolerant first group has less intrinsic starvation tolerance than at least one member of the starvation intolerant second group.

15. The architecture of claim 12 comprising a main pump for supplying the lubricant to the first and second branches and wherein the means for backflowing includes a auxiliary pump in the second branch.

* * * * *